United States Patent
Brady

(10) Patent No.: US 7,038,802 B2
(45) Date of Patent: May 2, 2006

(54) FLEXIBLE NETWORKED IMAGE PROCESSING

(75) Inventor: Thomas P Brady, Methuen, MA (US)

(73) Assignee: Agfa Corporation, Wilmington, MA (US)

( * ) Notice: Subject to any disclaimer, the term of this patent is extended or adjusted under 35 U.S.C. 154(b) by 931 days.

(21) Appl. No.: 09/974,852

(22) Filed: Oct. 12, 2001

(65) Prior Publication Data

US 2002/0093679 A1 Jul. 18, 2002

Related U.S. Application Data

(63) Continuation-in-part of application No. 09/827,315, filed on Apr. 6, 2001, and a continuation-in-part of application No. 09/750,188, filed on Dec. 29, 2000, and a continuation-in-part of application No. 09/750,293, filed on Dec. 29, 2000.

(51) Int. Cl.
*G06F 15/00* (2006.01)
*G06F 15/16* (2006.01)

(52) U.S. Cl. .................. 358/1.15; 358/1.13; 358/1.15; 358/1.16; 709/246

(58) Field of Classification Search ............... 358/1.13, 358/1.15, 1.16; 709/246
See application file for complete search history.

(56) References Cited

U.S. PATENT DOCUMENTS

| | | | |
|---|---|---|---|
| 6,611,347 B1 * | 8/2003 | Okada et al. | 358/1.15 |
| 6,738,158 B1 * | 5/2004 | Lupien et al. | 358/1.16 |
| 6,816,271 B1 * | 11/2004 | Takahashi | 358/1.13 |
| 2001/0043753 A1 * | 11/2001 | Grohs et al. | 382/248 |

* cited by examiner

*Primary Examiner*—Douglas Q. Tran
*Assistant Examiner*—Peter Huntsinger
(74) *Attorney, Agent, or Firm*—Ira V. Heffan; Robert A. Sabourin; Joseph King

(57) ABSTRACT

A networked imaging system, includes first and second communications networks, and first and second storage devices respectively interconnected to the first and second networks. A first image processor, interconnected to the first network, generates first image data representing a first image and writes the first image data to the first storage device. A second image processor, interconnected to the second network, generates second image data representing a second image. A first print driver, interconnected to the first and the second networks, writes the second image data to the second storage device and generates first drive instructions corresponding to the written first image data. A second print driver, interconnected to the second network, generates second drive instructions corresponding to the written second image data. First and second image makers respectively generate a representation of the first and second images according to the first and second drive instructions.

20 Claims, 7 Drawing Sheets

| CODE DICTIONARY | |
|---|---|
| CODE NUMBER | REPRESENTING |
| 100 | 0 (WHITE) |
| 101 | 1 (BLACK) |
| 102 | RESET |
| 103 | END |
| 104 | NEW PATTERNS |
| 105 | ab |
| 106 | bc |
| 107 | c0 |
| 108 | 01 |
| 109 | 1c |
| 110 | 107 1 (c01) |

PREDEFINED CODES *1330* (codes 100–104)
NEW CODES *1340* (codes 105–110)

FLEXIBLE NETWORKED IMAGE PROCESSING

RELATED APPLICATIONS

The present application is a continuation-in-part of pending U.S. application Ser. No. 09/750,188, filed Dec. 29, 2000, and entitled "Enhanced Data Compression Technique"; U.S. application Ser. No. 09/750,293, filed Dec. 29, 2000, and entitled "Dual Mode Data Compression Technique"; and pending U.S. application Ser. No. 09/827,315, filed Apr. 6, 2001, and entitled "Enhanced Networked Pre-Press Imaging".

TECHNICAL FIELD

The present application relates generally to networked image processing and more particularly to networked image processing with enhanced flexibility particularly suitable for use in the graphical arts and capable of accommodating multiple raster image processors and/or print drivers.

BACKGROUND ART

As shown in FIG. 1, a conventional pre-press imaging system 100 commonly includes a raster image processor (RIP) 105, or other type image processor, a print drive server (PDS) 110, and one or more image markers (IM), such as a pre-press imagesetter (PPIS) 115 having an optical scan assembly, e.g. a laser scanner, and a support surface, e.g. a cylindrical drum, and/or an image proofer (IP) 120, e.g. a color proofing device.

In operation, the RIP 105 receives, as input, a digitized image from a front-end processor (not shown) or via user commands entered on a user input device (not shown), and processes the received input to generate raster image data representing the input image. The raster image data is transmitted from the RIP 105 to the PDS 110, and subsequently processed by the PDS 110 to generate appropriate instructions for the applicable IM 115 or 120. These instructions are transmitted from the PDS 110 to the IM 115 or 120.

For example, if an IP 120 is included as part of the system, the instructions for the IP 120 may be transmitted by the PDS 120 to the IP 120 prior to instructions being transmitted by the PDS 120 to the PPIS 115. The IP 120 operates in accordance with the received PDS instructions to generate an image proof, e.g. a color proof, for inspection by a system operator, as is well understood in the art. If the proof is deemed acceptable, PDS instructions for the PPIS 115 are transmitted to the PPIS 115. In accordance with these received instructions, the optical scan assembly of the PPIS 115 operates to scan the image represented by the PDS instructions onto a plate or film supported by the support surface of the PPIS 115. In this way, the input image is transferred to the plate or film, which in turn can be used to print the input image on other media, e.g. paper.

More recently, enhancements in print drive server capabilities, and particularly the introduction of the AGFAT™ Apogee™ print drive server, have allowed multiple RIPs to be serviced by one or more PDS over a network. FIG. 2, depicts a convention networked imaging system 200 with an Ethernet network 225 linking multiple RIPs 205 to a single PDSs 210. It will be recognized that additional PDSs could also be linked to the multiple RIPs 205 via the network 225 if so desired. The RIPs 205 and PDS 210 are typically configured on separate workstations, and communicate via the network 225. However, if desired, a single workstation could serve as both the PDS 210 and one of the RIPs 205.

In operation, each of the networked system RIPs 205 processes received input to generate raster image data. The applicable RIPs 205 then typically transmits this data via the network 225 to a remote storage device 230, i.e. typically a storage device remote to both the applicable RIP 205 and the PDS 210, but accessible to both the applicable RIP 205 and PDS 210 via the network 225. The transmitted raster image data is written into a storage file of the remote storage device 230. The remote storage device 230 could, for example, be a magnetic or optical disk or some other type storage device.

The stored data is retrieved, typically via the network 225, by the PDS 210 from the remote storage device 230 by reading the applicable storage file when needed. The read raster image data is transmitted to the PDS 210 via the network 225, and processed to generate instructions for the applicable IM 215 and/or 220. These instructions are in turn transmitted to the applicable IM 215 and/or 220, either via a dedicated link 227 in the case of the PPIS 215, or via the network 225 in the case of the IP 220.

However, in the case where the RIP 205 and PDS 210 are implemented in a single workstation, the raster image data generated by that RIP 205 will typically be stored in a local storage device (not shown). In such a case, there is no need to transmit the raster image data via the network 225. Furthermore, even in the case where the RIP 205 and PDS 210 are implemented on separate workstations, the raster image data generated by that RIP 205 may be stored in a storage device local to the applicable RIP 205 or the PDS 210. In the case where the storage device is local to the RIP 205, there will be no need for the RIP 205 to transmit the raster image data via the network 225 to the storage device 230. In the case where the storage device is local to the PDS 210, there will be no need for the PDS 210 to retrieve the stored raster image data via the network 225 from the storage device 230. Hence, in either of these later cases only a single transmission of the raster image data over the network 225 is required.

When a job begins, the RIP 205 requests a destination storage device and path from the PDS 210. If the RIP 205 and PDS 210 are implemented on same workstation, the destination storage device will normally be a local storage device and the raster image data is simply written as a file to local storage. If not, the destination drive and path request is communicated via a network 225.

If the PDS 210 destination storage device letter designation e.g. "drive c" provided to the RIP 205 in response to the request is to a remote, mapped storage device 230, the RIP 205 will transmit the raster image data over the network 225 and the data will be written directly to storage at the designated storage device 230 via remote file access by the RIP 205.

On the other hand, if the PDS 210 destination storage device letter designation is to a remote, at least with respect to the RIP 205, unmapped device, e.g. a storage device local to the PDS 210, the RIP 205 will transmit the raster image data over the network 225 to the PDS 210. The PDS 210 will then transmit the raster image data over the network 225 and the data will be written to storage at the designated storage device via remote file access by the PDS 210.

If the PDS 210 destination storage device letter designation is not to a remote storage device, but rather to a storage device which is local to the RIP 205, the raster image data is simply written as a file to local storage.

In all of the above cases, the RIP 205 informs the PDS 210 that the image data has been written once storage has been completed.

Pseudo code for the above is as follows:
1) RIP->PDS: Query, where should data be written?*
2) PDS->RIP: Response, X:\path\ . . . \filename*
3) RIP Processing
   a) if RIP and PDS are on different workstations (i) and if X is a remote, mapped drive write image data via remote file system*, (ii) and else write image data via PDS interface*
   b) else write image data to local drive
4) RIP->PDS: Data has been written*
   where *=Ethernet transmission The electronic pre-press workflow involves the generation of large amounts of raster image data by the RIPs 205 and the consumption of this data by an IM, e.g. the PPIS 215 or the IP 220. As discussed above, often the RIPs 205 store the raster image data at and the PDS 210 retrieves the stored raster image data from a remote storage device 230. In such cases multiple transmissions of the raster image data via the network 225 are required, i.e. transmissions to and from the applicable storage device 230.

Furthermore, on occasion the RIPs 205 may store the raster image data at and the PDS 210 may retrieve the stored raster image data from a storage device which is local to either the applicable RIP 205 or the PDS 210, but not to both. In such cases, at least one transmission of the raster image data via the network 225 is still required, i.e. transmissions to or from the applicable storage device.

Although conventional networked imaging systems developed since the introduction of AGFAT™ Apogee™ print drive server are a vast improvement over imaging systems developed prior to its introduction, conventional networked imaging systems, such as that depicted in FIG. 2, have experienced certain problems which have been difficult to overcome.

More particularly, because of the large amounts of raster image data which must be communicated via these networks, the transmission(s) of this data over the network 225 can significantly degrade the overall performance of the network 225. The uncompressed image data for a normal four color job can exceed 10 Gigabytes. Data compression and decompression help to reduce the amount of data which must be transmitted and stored, but even in compressed form the raster image data can be quite large, e.g. more than 1 Gigabyte per job.

If a large amount of network bandwidth is allocated to each such transmission, this may result in delays in the transmission of other data, including other raster image data over the network, or in the inability to transmit other data altogether during the transmission of the raster image data, due to inadequate total bandwidth capacity of a given network link.

Further still, in some networks even if the maximum possible bandwidth is allocated to the transmission of raster image data, the transmission of the raster image data may still be unduly slow, and also delay or prevent other transmissions over the network for a relatively lengthy period of time. For example, the transfer of image data for a job, using 100 Megabits/second 100 Base-T, can consume the entire network bandwidth for up to two minutes.

Another problem arises in the amount of memory needed to store the raster image data. In order to store jobs, for example at 1 Gigabyte per job, the network storage device(s) must have large capacity, high access speed, and easily expandable memory resources. The need to add remote storage devices to the network and map these devices within the RIPs and PDS is a complex and time consuming task.

Therefore a need exists for an improved technique for networking multiple RIPs, one or more PDSs and one or more storage devices which are remote to either the RIPS, or the PDS(s), or both.

Even if the problems relating to the need to communicate and store large amounts of raster image data on these networks could somehow be solved, other problems could remain. For example, a network PDS may still be unable to provide the drive instructions to the IM when needed. This might occur if the PDS is processing image data to generate instructions for one IM while another IM is waiting for instructions from the same PDS.

Furthermore, in certain implementations the multiple RIPs being networked may include RIPs having different capabilities. For example, some networked RIP's may be capable of compressing image data in the desired manner. Other RIPs may be older RIPs, sometimes characterized as "legacy RIPs", which have been designed to directly interface with an IM, e.g. a PPIS or an IP. Hence, legacy RIPs may be incapable of compressing image data at all or of writing data to a file that can be shared with a PDS.

Still other RIPs may be incapable of generating image data in the desired format. For example, conventional image data formats, such as DCS and TIFF, may not be the desired image data format of a PDS. These other RIPs may also or alternatively be incapable of compressing image data in the desired manner, or at all.

As noted above, in the graphic arts there is a tendency to have extremely large images. For example, one-bit-per-sample images approaching or even exceeding 2 Gigabytes of data are quite common. As also noted above, the need to compress such data has been well known for many years. Compression of the image data is particularly useful in networked image processing, since not only is compression helpful in reducing storage requirements, but compression can also reduce the network communication resources required to transmit the image data.

One type of proposed techniques for compressing such data is commonly referred to as a pack-bit (PB) compression technique. Using proposed PB compression techniques, either a string of characters is preceded with a count and a repeat character code or a single byte pattern is preceded with a count. Proposed PB compression techniques are capable of processing data very quickly. These techniques also provide satisfactory results if the data is either solid black or solid white, and hence digitally represented in binary form by all 1's or 0's. Accordingly, PB techniques provide reasonably satisfactory results for non-color image data.

An exemplary pack-bits representation of a stream of sequential input data, as it would appear entering a processor prior to encoding, might include the string of characters "abc0000000000". Using the PB technique, the processor would first determined whether or not the first character "a" and the second character "b" match. Under some proposed PB techniques, the processor might scan ahead to consider other matches in certain of the subsequent characters. In any event, since in the present example the determination is negative, the processor proceeds to encode the input data as a literal string with a length. The processor next determines whether or not the second character "b" and the third character "c" match. Since this determination is also negative, the processor will proceed to encode the three characters of the input data as a literal string with a length. The processor now determines whether or not the third character "c" and the fourth character "0" match. Since this determination is also negative, the processor will proceed to encode the four characters of the input data as a literal string with a length. The processor continues by determining whether or not the fourth character "0" and the fifth character "0" match. Since this determination is positive, the processor continues by determining whether or not the immediately subsequent characters in the sequence also match, until it makes a negative determination. The processor thereby determines the repeat count for the character "0". Based on the initial positive determination, the processor also proceeds to encode the first three characters of the input data sequence, i.e. "a", "b" and "c", as a literal string with a length and the following 10 characters of the input data sequence, i.e. the "0", . . . "0", as a repeat character with a count.

Accordingly, the processor generates encoded output data forming a 2-byte sequence including the strings of characters "82abc" and "090". In the output data, the "8" serves as a header and indicates that the total length of the sequence is 8 bits and a literal string follows, the "2" indicates that the length of the literal string is three characters, i.e. characters "a", "b", and "c", the first "0" indicates a repeat character follows, and the "9" indicates that the repeat character represented by the second "0" is repeated 10 times.

To decode the encoded sequence "82abc090", the receiving processor first reads the new header "8", which is the highest order bit, and from the header determines that a literal string follows. The processor then extracts the length "2" and reads the next three characters "a", "b" and "c". The processor next reads the first "0" and from this determines that a repeat character follows. The processor continues by extracting the count "9" and reading the next character "0", which is the character to be repeated 10 times. It will be recognized that by using one-off numbers such as the "2" to indicate a literal string of 3 characters and the "9" to indicate that a repeat character is repeated 10 times, a close to 1% improvement is obtainable because 128 bytes can be packed into 129.

As should be clear from the above, PB techniques process only one character at a time. Accordingly, PB techniques are incapable of compressing strings of repeating multiple byte patterns. PB techniques also have a relatively limited compression rate, generally no more than 64 to 1. Thus, PB compression techniques provide unsatisfactory results when used to compress color image data.

Another type of proposed technique for compressing image data is commonly referred to as the Lempel-Ziv-Welch (LZW) compression technique. Using proposed LZW compression techniques variable length of strings of byte based data can be processed. Proposed LZW compression technique, process the data somewhat slower than PB compression techniques, but provide satisfactory results on data representing color images as well as black and white images. However, since these techniques are based on single bytes of data, such techniques are incapable of compressing data on an arbitrary pixel or bit boundary basis. Additionally, although such techniques, are capable of providing a higher compression rate than PB compression techniques, LZW techniques still offer a somewhat limited compression rate.

An exemplary LZW representation of a stream of sequential input data, as it would appear entering a processor prior to encoding, might include the string of characters "abc01c01". Using the LZW technique, the encoding and decoding processors must coordinate on the transmission and receipt of codes. LZW techniques use a compression dictionary containing some limited number of compression codes defined during the processing of the input data. The characters in the input string are read on a character by character basis to determine if a sub-string of characters match a compression code defined during the processing of prior characters in the input string. If so, the matching sub-string of characters is encoded with the applicable compression code. If a sub-string of characters does not match a pre-existing code, a new code corresponding to the sub-string is added to the dictionary. Sub-strings are initially defined by codes having 9 bits or digits, but the number of bits may be increased up to 12 bits to add new codes. Once the 12 bit limit is exceeded, the dictionary is reset and subsequent codes are again defined initially with 9 bits. In conventional LZW techniques, two codes are predefined, i.e. defined prior to initiating processing of the input string. In the present example these codes are the code 100, representing a reset, and the code 101, representing an end. In the present example, codes 102, 103, and 104 etc. represent strings of new patterns which are identified during the processing of the input data.

Using the LZW technique, the encoding processor would first read the "a" in the sequence and the "b" immediately thereafter in the sequence. The processor then determines if a code exists for the character sequence "ab". Since, in this example, no such code exists at this point in the processing, a new code 103 is generated to represent the new pattern string "ab". The processor continues by reading the "c" immediately following the "b" in the sequence. The processor determines if a code exists for the character sequence "bc". Since, in this example, no such code exists at this point in the processing, a new code 104 is generated to represent the new pattern string "bc".

The processor continues by reading the "0" immediately following the "c" in the sequence. The processor determines if a code exists for the character sequence "c0". Since, in this example, no such code exists at this point in the processing, a new code 105 is generated to represent the new pattern string "c0". The processor continues further by reading the "1" immediately following the "0" in the sequence. The processor determines if a code exists for the character sequence "01". Since, in this example, no such code exist at this point in the processing, a new code 106 is generated to represent the new pattern string "01". The processor proceeds by reading the "c" immediately following the "1" in the sequence. The processor determines if a code exists for the character sequence "1c". Since, in this example, no such code exists at this point in the processing, a new code 107 is generated to represent the new pattern string "1c".

The processor proceeds by reading the "0" immediately following the second "c" in the sequence. The processor determines if a code exists for the character sequence "c0". In this example, such a code, i.e. code 105, does exist. The processor therefore proceeds by reading the "1" immediately following the second "c0" in the sequence. The processor determines if a code exists for the character sequence "c01". Since, in this example, such a code does not exist, a new code 108 is generated to represent the new pattern string "c01" which can be represented as "1051". The processor ultimately generates encoded output data forming a sequence including the string of characters "100abc01c105".

Using the LZW technique, the encoding processor builds a tree of codes generated using other codes. This is a primary reason why the LZW techniques provide satisfactory results even though processing is performed on a byte by byte basis to find repeating bytes. That is, the downstream encoding builds on the upstream encoding. However, using the LZW technique, the encoding processor can take significant processing time to encode large sequences. For example, if there is a large, say a megabyte, occurrence of adjacent 0's or 1's, a significant period of time will be required by the processor to encode the sequence.

The decoding processor builds a similar tree from the codes received from the encoding processor. Basically, the decoding processor performs the reciprocal of the encoding process to decode the encoded sequence characters "100abc011051".

In summary, the PB compression technique is deficient in that it addresses only single byte repeats and is limited to a 64 to 1 compression rate. Therefore, it is not suitable for color images. On the other hand, the LZW compression technique addresses multi-byte repeats and has a compression rate of perhaps 500 to 1, but requires significant processing time to build the codes which are required to obtain good compression. Hence, although the LZW technique may be suitable where relatively small amounts of data are involved, where the encoding of gigabytes of data is required, such as with an 80 inch×50 inch image having 2400 dots per inch, the processing time and/or resources to encode data using the LZW technique make the technique impractical.

Accordingly, a need exist for a technique which can quickly compress large amounts of image data, offer a still higher compression rate than previously proposed techniques, and provide satisfactory results when used to compress either color or noncolor image data.

However, even if a better technique could be found to compress large amounts of raster image data, a question remains as to how such an improved technique can be implemented in a networked image processing system having multiple RIPs and/or multiple PDSS. More particularly, as discussed above some RIPs included in the network may be incapable of compressing image data in a desired manner and other RIPs may be incapable of compressing image data at all.

Therefore a need exists for improve networked image processing technique having the flexibility to better facilitate the use of compressed image data, and/or improved storage and communications capabilities.

OBJECTIVES OF THE INVENTION

Accordingly, it is an object of the present invention to provide an improved networked image processing technique having the flexibility to better facilitate the use of compressed image data, and/or provide enhanced storage and communications capabilities.

It is a further object of the present invention to provide an improved networked image processing technique suitable for use in networks having multiple different types of RIPs, one or more PDSs and/or one or more storage devices.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the invention, a networked imaging system includes first and second communications networks. Preferably, these networks include respective communications links, and the links of the first network have a bandwidth greater than that of the links of the second network.

A first storage device is interconnected to the first network, and a second storage device is interconnected to the second network. A first image processor, such as a raster image processor, is interconnected to the first network and configured, e.g. programmed, to generate first image data, e.g. raster image data, representing a first image. The first image processor writes the generated first image data to the first storage device. A second image processor, for example another raster image processor, is interconnected to the second network, and generates second image data representing a second image.

A first print driver is interconnected to the first and second networks and writes the second image data to the second storage device. The first print driver also generates first drive instructions corresponding to the written first image data. A second print driver is interconnected to the second network and generates second drive instructions corresponding to the written second image data.

A first image maker generates a representation of the first image in accordance with the first drive instructions. A second image maker generates a representation of the second image in accordance with the second drive instructions. The first image maker could, for example, be a high resolution imager, such as an image setter, plate setter or high resolution proofer, and the second image maker could, for example, be a different high resolution image maker. On the other hand, the first and second image makers could be a single image maker, such as a lower resolution proofer. However, preferably, the network system includes both separate high resolution image makers for respectively generating high resolution image representations in accordance with the drive instructions of a respective one of the print drivers, and a lower resolution image maker for generating lower resolution image representations in accordance with the drive instructions of both print drivers. It will be recognized that each print driver will typically generate different drive instructions to respectively drive the high and low resolution image makers.

According to other aspects of the invention, the first communications network may include a dedicated link between the first image processor and the first storage device, and another dedicated link between the first print driver and the first storage device. The first print driver may read the first image data from the first storage device via the first communications network and write the second image data to the second storage device via the second communications network. The first image processor may be further configured to transmit, to the first print driver via the second communications network, a message indicative of the first image data having been written to the first storage device.

Beneficially, the first image processor compresses the first image data. In such a case, the written first image data is the compressed first image data. The first print driver decompresses the written first image data and processes the decompressed first image data to generate the first drive instructions. The first print driver may also compress the generated second image data, in which case the written second image data is the compressed second image data.

According to still other aspects of the invention, the second image processor generates the second image data in a first format. In such a case, the first print driver reformats the second image data in the first format to a second format and may also compress reformatted second image data, as discussed above. If so, the written second image data is the compressed reformatted second image data.

In another alternative implementation, if the written second image data is in a first format, the first print driver may reformat this data into a second format. In such case, the second print driver processes the reformatted second image data to generate the second drive instructions.

In a particularly preferred implementation, the first image processor converts a first sequence of characters representing the first image into a second sequence of characters, including a predefined compression code for at least one of white image data and black image data, in order to generate the first image data. Thus, the written first image data will include the second sequence of characters. The first print driver coverts the written second sequence of characters into the first sequence of characters based on the predefined compression code in order to generate the first drive instructions.

If this particularly preferred implementation is adopted, the first image processor advantageously coverts the first sequence of characters by reading a first character in the first sequence of characters, to determine if the read first character represents the white or black image data. If so, the image processor reads one or more characters occurring immediately subsequent to the first character in the first sequence of characters, to determine if the later read character(s) match the read first character. If so, the processor generates the second sequence of characters to represent the matching one or more characters.

In a process for implementing the invention, a representation of an image is generated by writing and then retrieving first image data, representing a first image, to and from a first storage device via a first communications network. If desired, a message indicative of the first image data having been written to the first storage device is transmitted via a second communications network. First instructions are generated to correspond to the retrieved first image data. Second image data, representing a second image, is written to and then retrieved from a second storage device, for example via the second communications network. The retrieved second image data is transmitted, for example via the second communications network. Second instructions, corresponding to the transmitted second image data, are then generated. Representations of the first and second images are generated in accordance with the first and second instruction.

If both the first and second instructions are to be processed by a single image maker, such as a lower resolution proofer, it may be desirable for these instructions to be transmitted via the second network. The applicable image maker would then generate the representations of the first and second images in accordance with the transmitted first and second instructions.

According to other aspects of the inventive process, the first image data may be compressed. In such a case, the written first image data is the compressed first image data and the retrieved first image data is the written compressed first image data. This retrieved first image data is decompressed and the decompressed first image data is processed to generate the first drive instructions. If desired the second image data may also be compressed. In such case, the compressed second image data is written and retrieved.

According to still other aspects of the inventive process, the second image data may be reformatted from a first format to a second format and then compressed. In such a case, it is the compressed reformatted second image data that is written and retrieved. Alternatively, the written second image data may be reformatted so that the transmitted second image data is the reformatted data. In this case, it is the reformatted second image data which is processed to generate the second drive instructions.

Advantageously, the first image data is generated by converting a first sequence of characters representing the first image into a second sequence of characters, including a predefined compression code for one of white image data and black image data. In this implementation, the written first image data includes the second sequence of characters. The written second sequence of characters is then converted back into the first sequence of characters based on the predefined compression code in order to generate the first drive instructions.

The first sequence of characters may be converted by reading a first character in the first sequence of characters, determining if the read first character represents the white or black image data, and if so, reading one or more characters occurring immediately subsequent to the first character in the first sequence of characters. If the read one or more characters match the read first character, the second sequence of characters is generated to represent the matching character(s).

BRIEF DESCRIPTION OF DRAWINGS

FIG. 5 depicts an exemplary code dictionary for use with the second preferred compression technique implemented in the system of FIG. 4.

BEST MODE FOR CARRYING OUT THE INVENTION

In pre-press imaging, particularly for the flats having an entire plate worth of image information, most of the data is often either solid black or solid white, and hence digitally represented in binary form by all 1's or 0's. For halftone images all of the data is black and white.

Figure 1:
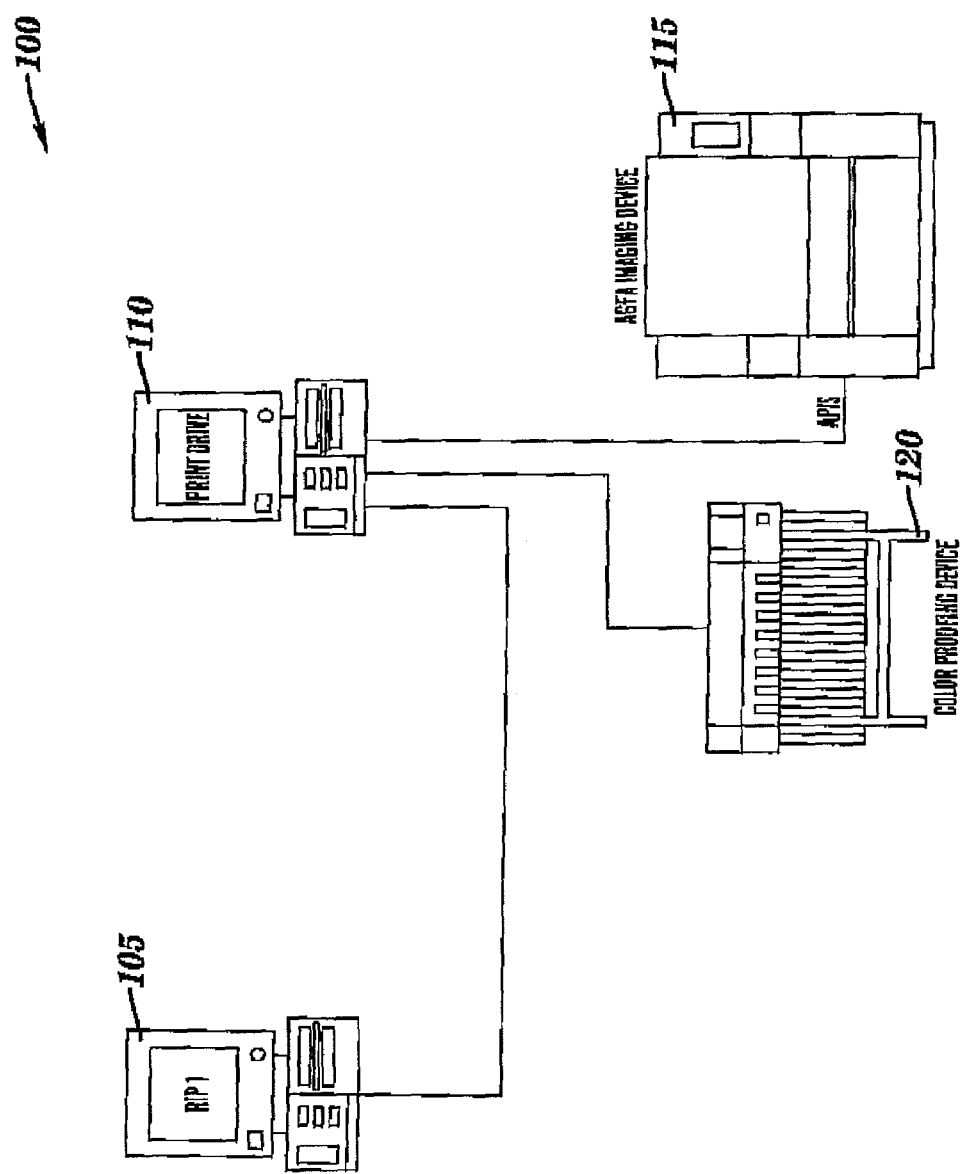
FIG. 1 depicts a conventional pre-press imaging system.
Figure 2:
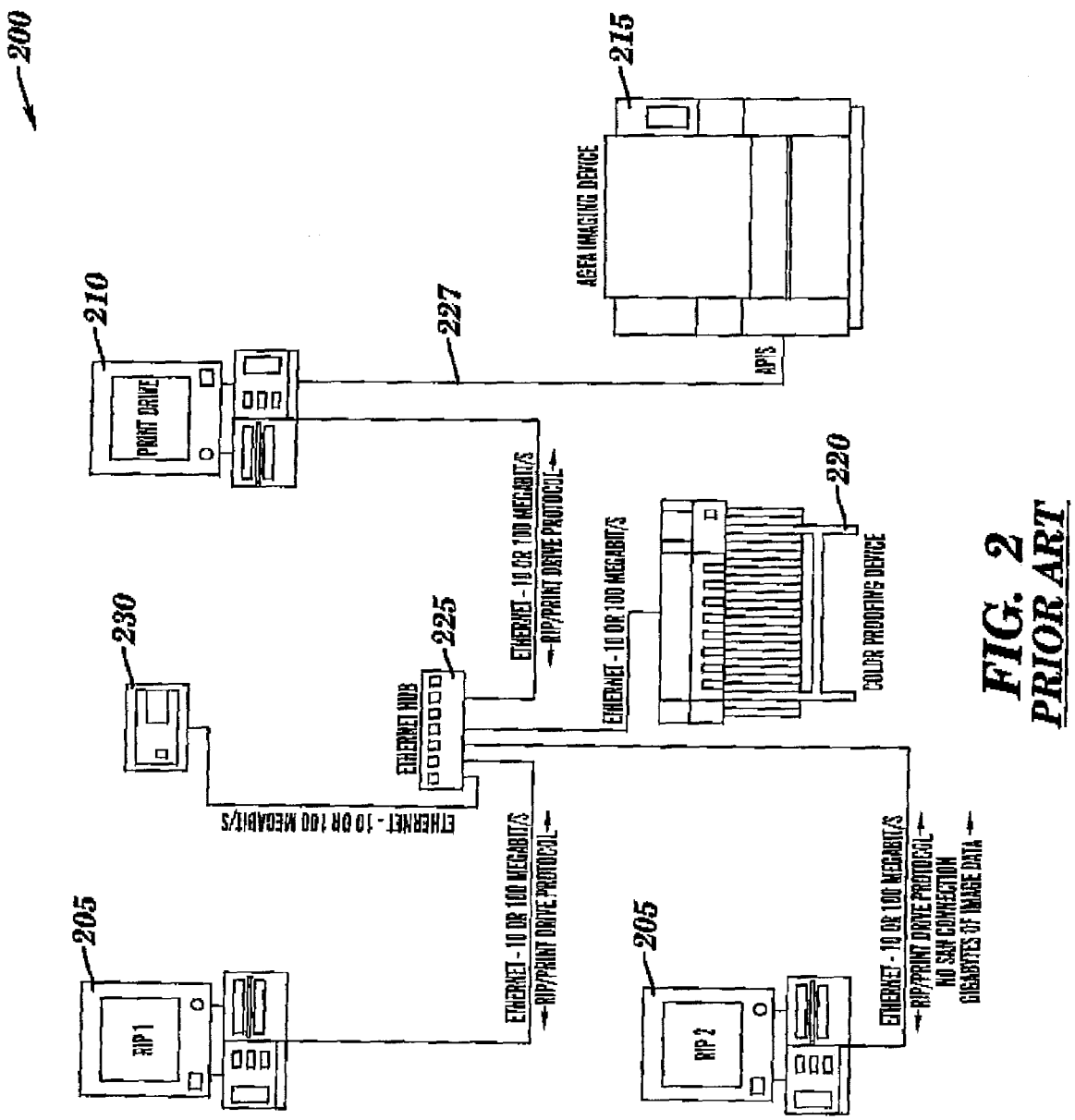
FIG. 2 depicts a conventional networked pre-press imaging system.
Figure 3:
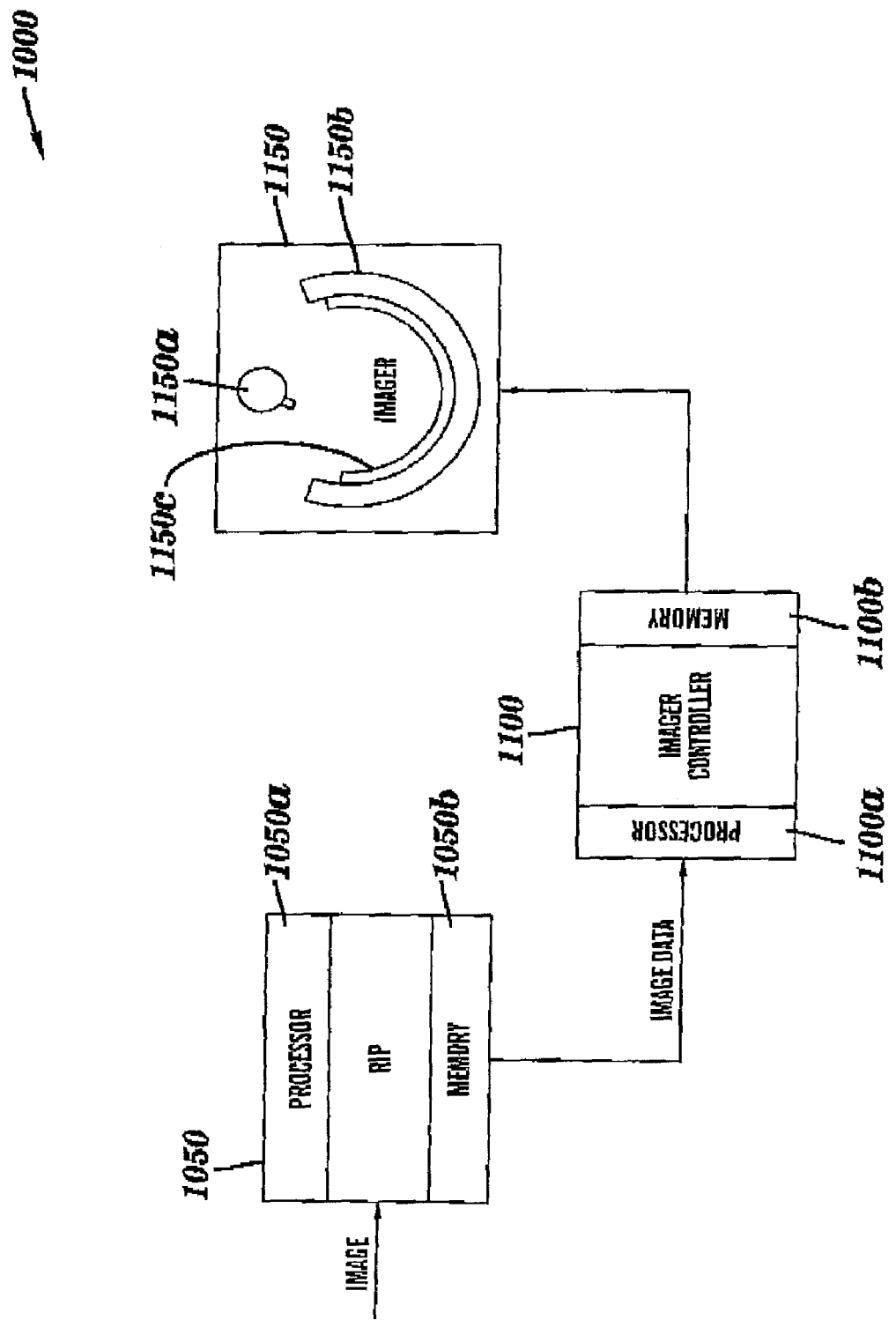
FIG. 3 depicts an exemplary simplified depiction of an image processing system which compresses image data based on a first preferred compression technique usable in a flexible networked image processing system according to the present invention.

FIG. 3 is a somewhat simplified, exemplary depiction of a image processing system 1000 with a first implementation of an improved compression technique usable in the enhanced flexibility networked imaging system of the present invention. The system 1000 includes a raster image processor (RIP) 1050, which includes a processor 1050a and a memory 1050b for storing processing instructions and other data as required. The RIP 1050 receives image data and converts the image data into encoded data. The image data is then transmitted to an imager control processor 1100, which includes a processor 1100a and a memory 1100b for storing processing instructions and other data as required. The controller 1100 generates control signals to the imager 1150 in accordance with the data received from the RIP 1050, to control the imager 1150. More particularly, the control signals from the processor 1100a control the operation of the imager scanning assembly 1150a so as to form the image on a medium 1150c, such as a film or plate, supported within the imager 1150. As shown, the imager includes a cylindrical drum 1150b for supporting the medium 1150c, but could alternatively include a flat bed or external drum for supporting the medium.

In a first mode of operation, which will hereafter be referred to as a flat banding mode, the RIP 1050 receives an 80 inch×50 inch color separated image having 2400 dots per inch. Preferably using imposition software on a front end preprocessor (not shown), the image could, for example, correspond to multiple pages of a magazine. In such a case, the image is formatted such that the image printed from the imaged medium 1150c is positioned so as to facilitate cutting, folding and stitching to create multiple properly printed and positioned magazine pages. In any event, the RIP 1050 converts the entire image into multiple gigabytes of encoded data as a single job.

However, due to processing power limitations of RIP 1050, the entire image cannot be converted into encoded data in a single operational process. Accordingly, the image is sliced into bands, prior to being converted, typically by the RIP 1050. If converted by the RIP 1050, this banding of the image may be performed by the RIP processor 1050a. However, conversion could also be preformed outside the RIP, for example by a preprocessor (not shown). Preferably, the RIP processor 1050a converts the image data representing each of the bands into encoded data in a separate operational process. Thus, the job is completed only after the multiple separate operational processes are performed by the RIP 1050 so as to convert all of the image data representing the bands for the entire image into encoded data. In practice, the larger the image the smaller is each image band, with all bands preferably being equal in size. Furthermore, the larger the image the greater the startup time required before beginning the conversion of the image data to encoded data, because the larger the image, the more pre-conversion processing required. Additionally, the more objects included in the image, the more memory that is required.

In a second mode of operation, sometimes referred to as a page assembly mode, the RIP 1050 receives, as multiple images, an 80 inch×50 inch color image having 2400 dots per inch. In this case, one of the multiple images, which might be characterized as a template image, includes information such as registration marks, color gradients, and identification marks, but is primarily white. Each of the other of the multiple images could, for example, be the image for a separate page of a magazine. Here, the RIP 1050 may be operated to convert the image data representing the entire template image into encoded data as one job and to convert all of image data representing the other of the multiple images into image data in another job. When fully converted, the multiple images will be represented by encoded data.

More particularly, in the page assembly mode, the image is divided into page assemblies, one of which is a primarily white template image which is typically processed by the RIP processor 1050a without being split into bands. The other of the multiple images are, however, typically sliced into bands prior to being encoded by the RIP 1050. Because the area of each of the other multiple images is much smaller than the area of the entire image discussed with reference to the first mode of operation, fewer bands are required and, as a whole, it will take less time to convert the image data representing the multiple images into encoded data in the page assembly mode than the time required to convert the image data representing entire image into image data in the banding mode discussed above. Thus, the RIP processor 1050a converts the image data for each of the bands for each of the other multiple images into encoded data in a separate operational process. The job, or jobs if the template image is pre-processed, is completed only after the multiple operational processes are performed to convert all of the image data representing the multiple images forming the entire image into encoded data.

Although, the image discussed with reference to the page assembly mode may be the same as the image discussed with reference to the prior page assembly mode, conversion in the page assembly mode will typically result in even a greater amount of encoded data than the conversion in the previously discussed banding mode. For example, two gigabytes of encoded data may be generated by the RIP 1050 to represent the image in the banding mode, while three gigabytes of image data could be generated by the RIP 1050 to represent the same image in the page assembly mode because there would be more uncompressed data. Further, whether the banding or page assembly modes are utilized by the RIP 1050, the entire image cannot be converted into encoded data in a single operational process due to processing power limitations of the RIP 1050. In the banding mode, the image bands may be satisfactorily converted using a LZW technique. In the page assembly mode, a template image, of say 16 megabytes, may be satisfactorily converted using a PB technique. However, the PB technique will often produce unsatisfactory results if used to convert the bands of the other of the multiple images. Accordingly, in the page assembly mode, these bands are converted using an LZW technique. Thus, in the page assembly mode, different compression techniques are utilized for a single image and perhaps even in a single job.

Accordingly, in the first implementation of the improved compression technique described above, the RIP 1050 is selectively operable in either the banding or the page assembly mode operation. Hence, in operation, the RIP 1050 initially scans the received image data representing the image, or image bands if the bands are sliced during pre-processing, to determine if banding mode or page assembly mode operations is required. If it is determined that banding mode operation is required, the RIP 1050 implements an LZW technique to convert the image data into encoded data. If, on the other hand, it is determined page assembly mode operation is required, the RIP 1050 further determines if the page image data represents a template image or banded image. If it is determined that the page image data represents a template image, the RIP 1050 implements a PB technique to convert the template image into encoded data. If, however, it is determined that the page image data represents a banded image, the RIP 1050 implements a LZW technique to convert the banded image data into encoded data. The selective operation of the RIP 1050, depending on the received image data facilitates the more efficient and effective processing of different types of large images than has been previously obtainable in conventional RIPs.

According to a second implementation of the improved compression technique, as a stream of sequential data is processed prior to encoding if, at the start of the sequence, the immediately preceding character, which is yet to be encoded, matches the next character in the stream and this next character is either solid black or solid white, and hence digitally represented in binary form by all 1's or 0's, encoding is interrupted. During the interruption, a determination is made as to whether the one or more characters, immediately following the next character in the sequence, also match the next character.

Figure 4:
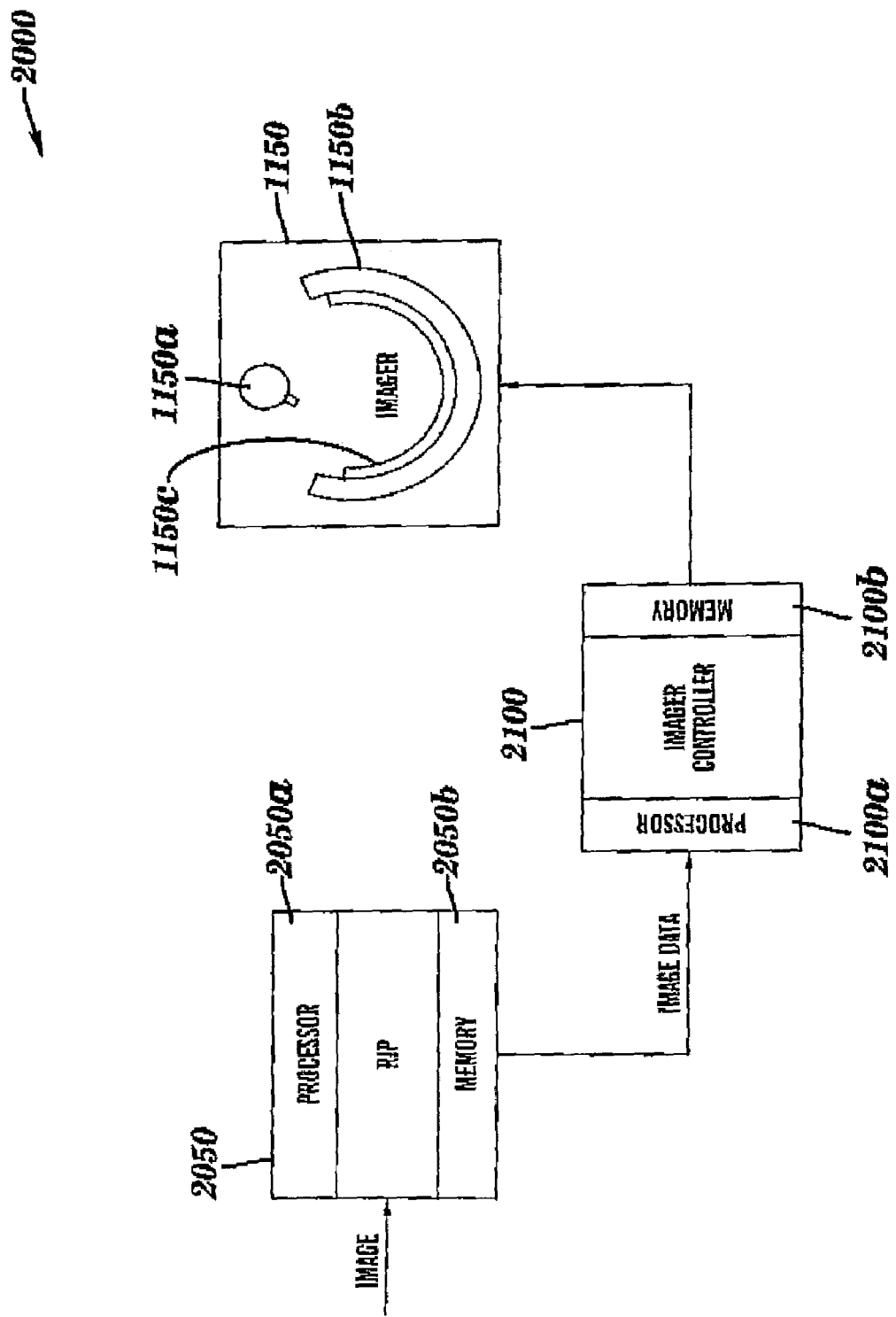
FIG. 4 depicts an exemplary simplified depiction of an image processing system which compresses image data based on a second preferred compression technique usable in a flexible networked image processing system according to the present invention.

The second implementation will now be described with reference to FIG. 4. As shown, FIG. 4 represents a somewhat simplified, exemplary depiction of an image processing system 2000. The system 2000 includes a raster image processor (RIP) 2050, which receives an image and converts the image into encoded data. The encoded data is then transmitted to print driver server 2100, which generates control signals to the imager 1150 in accordance with the encoded data received from the RIP 2050 to control the imager 1150 after decoding the received data. This imager 1150 is identical to the image 1150 of FIG. 3. More particularly, the control signals from the print drive server processor 2100a control the operation of the imager scanning assembly 1150a so as to form the image on a medium 1150c, which could be identical to the medium 1150c in FIG. 3. The medium 1150c is supported within the imager 1150 of FIG. 4. As shown, the imager 1150 includes a cylindrical drum 1150b for supporting the medium 1150c.

In the second implementation, the RIP processor 2050a implements a compression technique, which will hereafter be referred to as the AGFA compression technique. Using the AGFA compression technique, variable length of strings of byte based data can be processed. Processing using the AGFA technique will be substantially faster for many large image applications than the LZW compression techniques, while still providing satisfactory results for color images as well as those which are primarily black and white. Further, the AGFA technique is not limited to single bytes of data, and is therefore capable of compressing data on an arbitrary pixel or bit boundary basis. Additionally, the AGFA technique is capable of providing a higher compression rate than both PB and LZW compression techniques.

An exemplary representation of a stream of sequential input data as it would appear entering a RIP processor 2050a prior to encoding could, for example, include the string of characters "abc0 . . . 01c01". The string "0 . . . 0" is a large string of zero's, for example representing image information for 32k pixels.

Using the AGFA technique, the encoding and decoding processors, i.e. the RIP processor 2050a and print drive server processor 2100a, must coordinate on the transmission and receipt of codes, similar to the coordination required by LZW techniques. However, as will be described further below, the AGFA technique uses a compression dictionary containing four pre-defined compression codes. The characters in the input string are scanned to determine if a scanned sub-string of characters match certain of these pre-defined compression codes. If so, the matching sub-string of characters is encoded with the applicable pre-defined compression code. If a sub-string of characters does not match a pre-existing code, new codes corresponding to the sub-strings are added to the dictionary.

Further, the AGFA technique provides a look-ahead function, in which to determine whether or not the sub-string is greater than a minimum number, preferably 6, bytes, and if so the sub-string is encoded with a new code, which includes any applicable pre-existing code, and the length of the code field. The length is the width of the pre-existing code, with this code forming the most significant bits and serving as a continuation indicator, and any new coding, with this coding forming the least significant bits. Like LZW techniques, sub-strings are initially defined by codes having 9 bits or digits, but may be increased to up to 12 bits to add new codes. Once the 12 bit limit is exceeded, the dictionary is reset and subsequent codes are again defined initially with 9 bits.

Referring to FIG. 5, in the AGFA technique, four codes are predefined and stored in the code dictionary 3000 on RIP memory 2050b as codes 1330. In the present example these codes are the code 100, representing a sub-string of all zero bytes which corresponds to white, code 101, representing a sub-string of all one bytes which corresponds to black, code 102, representing a reset, and the code 103, representing an end of the compressed encoded data. In the present example, codes 104, 105, and 106 etc. represent sub-strings of new patterns which are generated during the processing of the input date and also stored on RIP memory 2050b in code dictionary 3000. It will be recognized that because codes for the strings corresponding to white and black are partially predefined, reduced processing is required to generate these codes, since the predefined codes can simply be read by RIP processor 2050a from the dictionary codes as required.

Using the AGFA technique, the RIP processor 2050a first sets a reset code 102 read from the code dictionary 3000 and reads the "a" in the sequence and the "b" immediately thereafter in the sequence. The RIP processor 2050a then determines from code dictionary 3000, if a code exists for the character sequence "ab". Since, in this example, no such code exists at this point in the processing, a new code 105 is generated to represent the new pattern string "ab" and stored in the code dictionary 3000 on memory 2050b. The RIP processor 2050a continues by reading the "c" immediately following the "b" in the sequence. The RIP processor 2050b determines if a code exists for the character sequence "bc". Since, in this example, no such code exist at this point in the processing, a new code 106 is generated to represent the new pattern string "bc" and stored in dictionary 3000.

The RIP 2050 continues by reading the "0" immediately following the "c" in the sequence. The RIP processor 2050a determines if a code exists for the character sequence "c0". Since, in this example, no such code exists at this point in the processing, a new code 107 is generated to represent the new pattern string "c0" and stored in dictionary 3000. Also, because the "0" is recognized as special, the RIP processor 2050a, automatically scans ahead to read the next character in the sequence to determine if it matches with the initial "0" in the sequence. If not, the scanning ahead is immediately discontinued and the RIP processor 2050a proceeds with normal processing. If so, the scanning ahead continues on a character by character basis until no match with "0" is found, at which point the scanning ahead is discontinued and normal processing continues.

In this exemplary application of the AGFA technique, the RIP processor 2050a scans ahead and counts the number of "0" or "1" bytes in the sequence. Preferably, a compression threshold is preestablished and stored on the RIP memory 2050b. For example, the threshold might correspond to a 4 to 1 compression rate. If such a threshold is utilized and the number of "0" or "1" bytes counted is less than the number required to meet or exceed the threshold, e.g. if the sequence consist of only one or two zeros or ones, then a new code would be established for the sequence in the normal manner. Only if the number of "0" or "1" bytes counted meets or exceeds the threshold, is the sequence encoded using the applicable pre-defined code 100 or 101.

Assuming in the present example that the number of "0" bytes counted by the RIP processor 2050*a* meets or exceeds the threshold, the count is determined to be a repeat count. Either of 9, 10, 11, or 12 bits can be used to code the repeat count. However, if the count is so great that more 11 bits would be required for the encoding, a continue code which may be generated by processor 2050*a* or retrieved from memory 2050*b*, is inserted as the least significant bit in the output code to enable the output codes representing the entire sequence of zeros or ones to be strung together. Accordingly, no matter how long the sequence, the low or less significant bit of each output code within the string of output codes would represent an end or continuation of the coding. Hence, 1 bit is sacrificed for the end/continuation bit leaving 8, 9, 10, or 11 bits for the repeat count.

Accordingly, in the present example the output code for the repeat count of "0" characters would be formed with the code "100" to indicate that this is a sequence of "0" characters, followed by "102" representing a first portion of the repeat count, and "001" indicating that the output codes for the repeat count continues. Thus, the first code in the string of repeat count output codes would be "100102001". The second code in the string of repeat count output codes could be "102001", with the "102" representing a second portion of the repeat count, and "001" indicating that the output codes for the repeat count continues. The last code in the string of repeat count output codes could be "0201". The high bit of the last output code "0201" is made clear to indicate that this is the end of the repeat count information in this field.

Using the repeat count multiple output codes, the strung together codes for the entire repeat count would, in the above example be "100102001102001 0201". Thus, the strung together multiple bytes of output codes provide a full representation of the repeat count. In practice, five output codes may be used to represent up to four billion characters. Notwithstanding the number of bits in the output codes, the high bit is used to represent the count. Accordingly, whatever output code size is used, full advantage is taken of all available bits for the repeat count.

It is perhaps worthwhile emphasizing here that conventional LZW techniques lack the ability to scan ahead. Conventional PB techniques, on the other hand, scan ahead to locate matches with whatever character has been read and must fully generate the match coding for each matching sequence. In contrast, the present improved technique scans ahead to locate matches with only selective characters, preferably only white and black, respectively represented herein by "0" and "1". Further, the present technique uses a predefined code for each of the selected characters, e.g. white and black, and hence the match coding for each matching sequence need only be partially generated, since the predefined code, e.g. codes 100 or 101, which identifies the applicable sequence as a sequence of white or black characters is pre-generated and need only be read from the code dictionary 3000. Accordingly, the present technique is capable of providing superior encoding of, for example, large images using less computing resources and computing time.

As noted above, once the RIP processor 2050*a* determines it is at the last "0" in the sequence, i. e. by determining from the scanning ahead on a character by character basis that a next character does not match with "0", the scanning ahead is discontinued and normal processing continues. Thus, the RIP processor 2050*a* continues by reading the "1" immediately following the last "0" in the sequence. The processor 2050*a* determines if a code exists for the character sequence "01". Since, in this example, no such code exist at this point in the processing, a new code 108 is generated to represent the new pattern string "01". The processor 2050*a* proceeds by reading the "c" immediately following the "1" in the sequence. The processor determines if a code exists for the character sequence "1c". Since, in this example, no such code exists at this point in the processing, a new code 109 is generated to represent the new pattern string "1c".

The processor further proceeds by reading the "0" immediately following the second "c" in the sequence. The processor 2050*a* determines if a code exists for the character sequence "c0". In this example, such a code, i.e. code 107, does exist. The RIP processor 2050*a* also scans ahead to determine if another "0" immediately follows this occurrence of "c0". Since, in this case the RIP processor 2050*a* determination is negative, the scanning ahead is discontinued and normal processing continues.

The processor 2050*a* now proceeds by reading the "1" immediately following the second "c0" in the sequence. The processor 2050*a* determines if a code exists for the character sequence "c01". Since, in this example, such a code does not exist, a new code 110 is generated to represent the new pattern string "c01" which can be represented as "1071". The RIP processor 2050*a* also scans ahead to determine if another "1" immediately follows this occurrence of "c01". Since, in this case the RIP processor 2050*a* determination is negative, the scanning ahead is discontinued and normal processing would continue if further characters remained to be encoded. However, since the "c01" are the final characters, encoding ends.

The processor ultimately generates encoded output data forming a sequence including the string of characters "102abc100102001102001 02011071103".

Similar to LZW techniques, in the AGFA technique, the RIP processor 2050*a* builds a tree of numerous codes generated using pre-defined or other codes and thereby is capable of providing satisfactory results even though the processing is performed on a byte by byte basis to find repeating bytes. However, as compared to LZW techniques, in the AGFA technique, processing time and resources required by the RIP 2050 to encode large sequences is substantially reduced through the use of special pre-defined codes. The decoding processor, i.e. the print drive server processor 2100*a*, which could serve as a print drive server (not shown) or be some other type decoding device, builds a similar tree using the codes in the code dictionary received from the encoding processor, i.e. the RIP processor 2050*a*. Basically, the decoding processor performs the reciprocal of the encoding process to decode the encoded sequence characters "102abc100102001102001 02011071103". It should be understood that the encoded data could, if desired, be transmitted to the decoding device via a direct communications link, a local network, a public network such as the Internet, or some other type of network. Further, such communications may be by wire communications or wireless communications.

Figure 6:
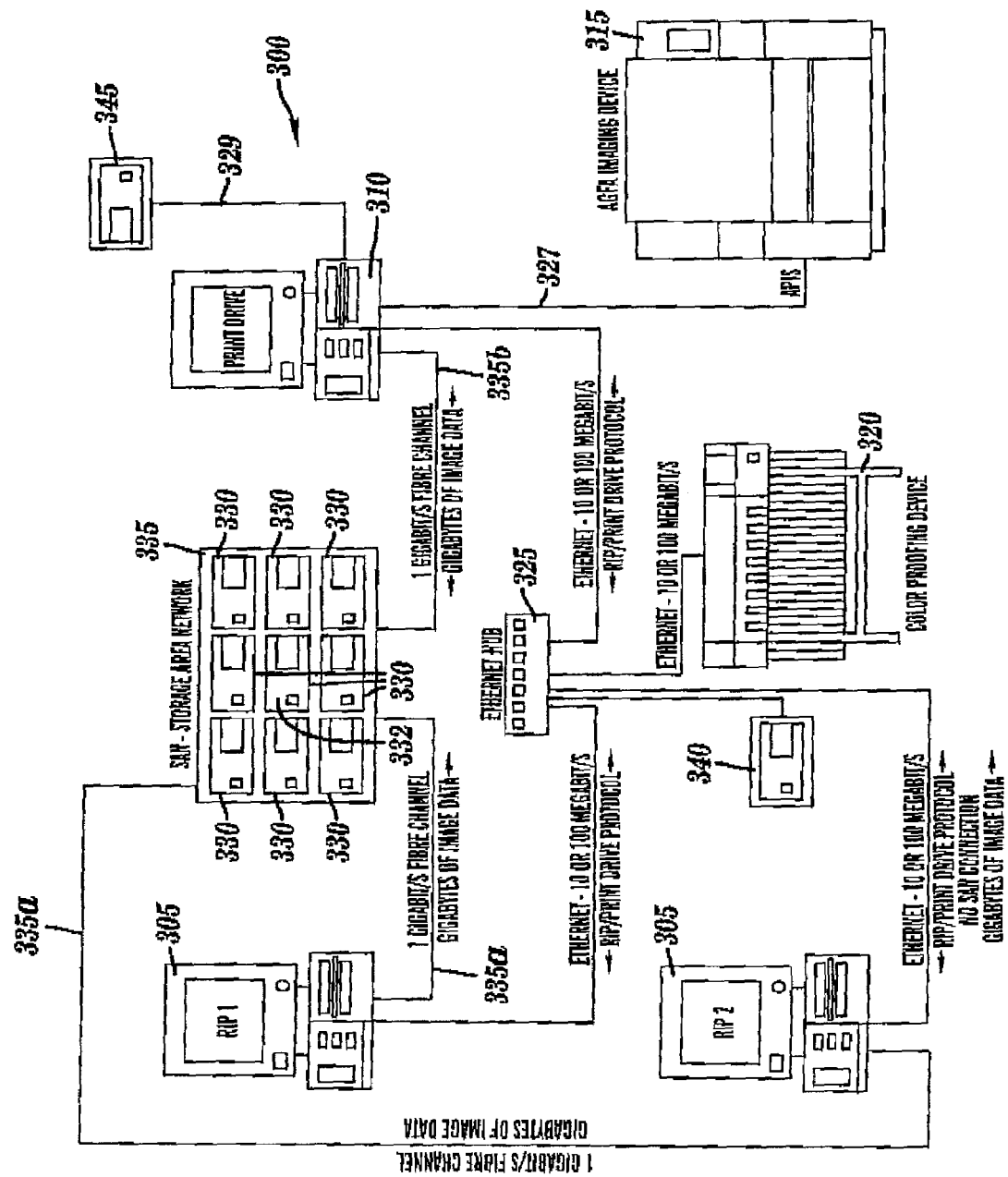
FIG. 6 depicts a networked imaging system having overlapping networks usable in a flexible networked image processing system according to the present invention.

FIG. 6 depicts an enhanced networked image processing system having the preferred overlapping networks usable in the enhanced flexible networked image processing system of the present invention. As shown, the networked system 300 includes multiple raster image processors (RIPs) 305, a print drive server (PDS) 310, and multiple image makers (IMs) 315 and 320. The IMs include a pre-press image setter (PPIS) 315 having an optical scan assembly, such as a laser scanner, and a support surface, such as a cylindrical drum, and an image proofer (IP) 320 which could, for example, be a color proofing device. A single workstation could serve as both the PDS 310 and one of the RIPs 305, although generally each RIP 305 and each PDS 310 will be implemented on a separate workstation. Also included are multiple remote SAN storage devices 330 and non-SAN storage devices 340 and 345, i. e. storage devices remote to both the RIPs 305 and the PDS 310, for storing raster image data generated by the RIPs 305. It will be recognized that the system is easily adaptable to accommodate storage devices local to the applicable RIP 305 or PDS 310, or local to both the applicable RIP 305 and the PDS 310 if the PDS 310 and applicable RIP 305 are implemented as a single workstation.

An Ethernet network 325, preferably formed of optical fiber or high-speed copper cable, interconnects the RIPs 305, PDS 310, storage device 340 and IP 320, thus providing links between each of the multiple RIPs 305 and the PDS 310 and the storage device 340, and between the PDS 310 and the IP 320. The PDS 310 is also connected to the PPIS 315 via a dedicated link 327. The PDS 310 is connected to the remote storage device 345 by a separate link or network 329. Additional PDSs 310 could also be interconnected to the multiple RIPs 305, and to the IP or other IPs via the Ethernet network, if so desired.

A storage area network (SAN) 335, preferably also formed of optical fiber or high-speed copper cable, interconnects the remote storage devices 330 with each of the RIPs 305 and the PDS 310, thus providing a respective dedicated link 335a or 335b between the remote SAN storage devices 330 and each of the multiple RIPs 305 and between the remote SAN storage devices 330 and the PDS 310. Accordingly, the networked pre-press imaging system 300 of FIG. 6 includes what may be characterized as overlapping Ethernet and storage area networks 325 and 335.

Preferably, the dedicated links 335a and 335b provided by the SAN 335 are very high speed, e.g. 100 Megabyte per second, connections. Advantageously, each of the multiple remote SAN storage devices 330 includes a fast, large memory, as are well known in the art. The multiple remote SAN storage devices 330 are configured in a pool of storage devices 332, as depicted in FIG. 6, which is easily expandable by adding additional remote SAN storage devices 330 to the SAN storage device pool 332.

In operation, each of the networked system RIPs 305 receives, as input, a digitized image from a respective or shared front-end processor (not shown) or via user commands entered on a user input device (not shown). The applicable RIP 305 processes the received input to generate raster image data representing the input image. The raster image data may be directly transmitted from the applicable RIP 305 via the SAN 335 to the SAN's multiple storage device pool 332 via the dedicated SAN link 335a between the applicable RIP 305 and SAN storage device pool 332.

The raster image data stored on the SAN storage device pool 332 is retrieved by the PDS 310 directly from the SAN storage device pool 332, via the dedicated SAN link 335b between the PDS 310 and storage device pool 332. The PDS 310 processes the retrieved raster image data to generate appropriate instructions to the applicable IM 315 or 320. These instructions are transmitted from the PDS 310 to the IM 315 or 320 via either the Ethernet network 325 or a dedicated non-network link 327.

More particularly, if the PDS 310 instructions are generated for the IP 320, the instructions are transmitted via the Ethernet network 325. On the other hand, if the PDS 310 instructions are generated for the PPIS 315, the instructions are transmitted via the dedicated non-network link 327.

Beneficially, the PDS 310 instructions for the IP 320 are transmitted to the IP 320 prior to PDS 310 instructions being transmitted to the PPIS 315. The IP 320 operates in accordance with the received PDS 310 instructions to generate an image proof, e.g. a color proof, for inspection by a system operator, as is well understood in the art.

If the proof is determined to be acceptable, the PDS 310 instructions for the PPIS 315 are transmitted via the dedicated non-network link 327 from the PDS 310 to the PPIS 315. In accordance with the received instructions, the optical scan assembly of the PPIS 315 operates to scan the image represented by the PDS 310 instructions onto a plate or film supported by the support surface of the PPIS 315. The image input to the RIP 305 is thereby transferred to the plate or film. The film or plate can in turn be used to print the input image on other media, e.g. paper.

Thus, the use of the SAN 335 solves problems relating to network bandwidth and storage capacity in convention networked pre-press systems. However, in order for the PDS 310 to retrieve raster image data from the SAN and other remote storage devices, each RIP 305 and the PDS 310 must somehow coordinate on the identity of the applicable storage device address. Thus, the use of the SAN 335 introduces a question as to how to identify the remote storage device at which particular raster image data should be stored.

This question is answered by adding a volume serial number query and response to the PDS protocol. More particularly, the PDS 310 is configured to transmit an applicable destination storage device identifier and path to each of the RIPs 305. Each of the RIPs 305 is configured to query PDS 310 for the identified storage device's volume serial number, after receipt of the destination and path information from the PDS 310. Each RIP 305 is further configured to process the storage device volume serial number returned by the PDS 310 in response to the query to determine if one of the volume serial numbers of the storage devices accessible to that RIP 305 matches the storage device volume serial number returned by the PDS 310. If so, the destination storage device is deemed to be a shared storage device, e.g. the SAN storage device pool 332 or the remote non-SAN storage device 340.

However, even after the RIP 305 has confirmed that the destination device designated by the PDS 310 is an accessible shared storage device, a further question remains. More particularly, since there is no established storage device identifier standard, one RIP 305 could, for example, identify a remote storage device as "Drive G", while another RIP 305 might identify the same remote storage device as "Drive Z". Further, the PDS 310 might identify the same remote storage device as "Drive D". Hence, the PDS 310 could seek to retrieve raster image data at address D:/xxx or D:/yyy which has been stored by one RIP 305 at address G:/xxx or by another RIP 305 by at address Z:/yyy. Thus, a question remains as to how the RIP's 305 and PDS 310 will share access to the remote storage devices, including device pool 332, such that the PDS 310 can easily access the appropriate raster image data stored by the RIPs 305 on the shared remote storage devices 332 and 340.

This potential problem is solved by mapping the PDS's 310 storage device address to applicable RIP 305 storage device address. More particularly, the PDS 310 is configured to retrieve the volume serial numbers, by stepping the drive designation for the destination device string from, for example, "C" to "Z". Drive designations "A" and "B" are assumed to be local drives, and are therefore not checked. The string is processed as an argument to a call, for example for "GetVolumeInformation(path, . . . )". If the destination volume's serial number matches that returned from GetVolumeInformation, the drive letter string is captured for subsequent use.

In certain operating systems, such as Windows™, call "GetLogicalDrives( )," provides a mask of assigned drive designation letters, and only assigned drive designation letters are checked. Further, in Windows™ call, "GetDriveType(path)," the device assigned to the drive designation letter in the path is described, and only drives with a "DRIVE FIXED" type are checked.

Referring again to FIG. 6, when a job begins, the RIP 305 requests a destination drive designation and path from the PDS 310. If the RIP 305 and PDS 310 reside on same workstation, the image data is written to the local drive as a file.

If not, the RIP 305 queries the PDS 310, via a communication over the Ethernet network 325, for the destination storage device's volume serial number. The PDS 310 processes the query and transmits the destination storage device's volume serial number to the RIP 305 via the Ethernet network 325.

The RIP 305 receives the destination storage device's volume serial number from the PDS 310, and processes the received serial number, typically by comparing it to those destination storage device volume serial numbers accessible to that RIP 305. Typically, these destination storage device volume serial numbers are stored locally at the applicable RIP 305. If the destination storage device's volume serial number received from the PDS 310 is determined to correspond to a storage device accessible to the RIP 305, e.g. determined by matching the received destination storage device's volume serial number and one of the stored accessible storage devices' volume serial numbers, the destination storage device identified by the PDS 310 is deemed by the RIP 305 to be a shared storage device. The RIP 305 drive designation for that device is mapped to the PDS designation for that same device.

If the identified destination storage device identified by the PDS 310 is further deemed to be a SAN storage device pool 332, the RIP 305 will transmit the raster image data to the identified SAN storage device pool 332 via the SAN 335. The transmitted raster image data is written as a file in the SAN storage device pool 332.

If not, the RIP 305 will determine if the PDS's 310 destination drive letter designation, e.g. "drive D" is to a remote, shared, mapped storage device, such as storage device 340 of FIG. 6. If so, the RIP 305 will transmit the raster image data to the remote storage device 340 over the Ethernet network 325. The transmitted raster image data will be written to the remote storage device 340 using the mapped RIP 305 designation, e.g. "drive G" for remote storage device 340, by remote file access.

If the PDS's 310 destination drive letter designation is not to a remote, shared, mapped storage device, e.g. storage device 345, the RIP 305 will transmit the raster image data to the PDS 310 over the SAN 335. The transmitted raster image data will be written to the identified storage device 345 by the PDS 310 using remote file access.

Pseudo code for implementing the above follows:
1) RIP->PDS: Query, where should data be written?*
2) PDS->RIP : Response, X:\path\ . . . \filename*
3) RIP Processing if RIP and PDS are on different workstations:
   a) RIP->PDS: Query, what is the volume ID?*
   b) PDS->RIP: Response, disk device volume ID*
   c) Y=GetLocalDriveID(volume ID)
   d) if Y is an accessible SAN drive write image data to SAN**
   e) else if Y is a remote mapped drive write image data via remote file system*
   f) else write image data via PDS interface**
4) else RIP Processing if RIP and PDS are on same workstation:
   a) Write image data to local drive
5) RIP->PDS: Data has been written*
   where *=Ethernet transfers.
   where **=high speed SAN transfers.

In FIG. 6, the RIPs 305 and PDS 310 have direct connections via the SAN 335. The RIPs 305 and PDS 310 use the Ethernet network link 325 to exchange protocol messages. The raster image data is preferably transmitted via the very high speed SAN links 335a and 335b. The SAN links 335a and 335b can provide 10 times the transfer speed, and allow the Ethernet bandwidth to be utilized for transmission of other than the raster image data, such as for transmitting the output of the PDS 310.

It should be understood that, if desired, other RIPs 305 which are not interconnected by the SAN 335 could be included in the networked system 300 of FIG. 6. Such RIPs 305 would accordingly transmit raster image data and other data, e.g. messages to the PDS 310, via the Ethernet network 325. However, the transmission of raster image data by these RIPs 305 would take at least 10 times longer over the Ethernet network 325 than transmissions of raster image data by the other RIPs 305 over the SAN 335. This could result in the Ethernet network 325 being saturated during the transfer of the raster image data by these non-SAN RIPs 305, and hence, other PDS 310 operations, requiring Ethernet network 325 transfers, could be adversely impacted.

Figure 7:
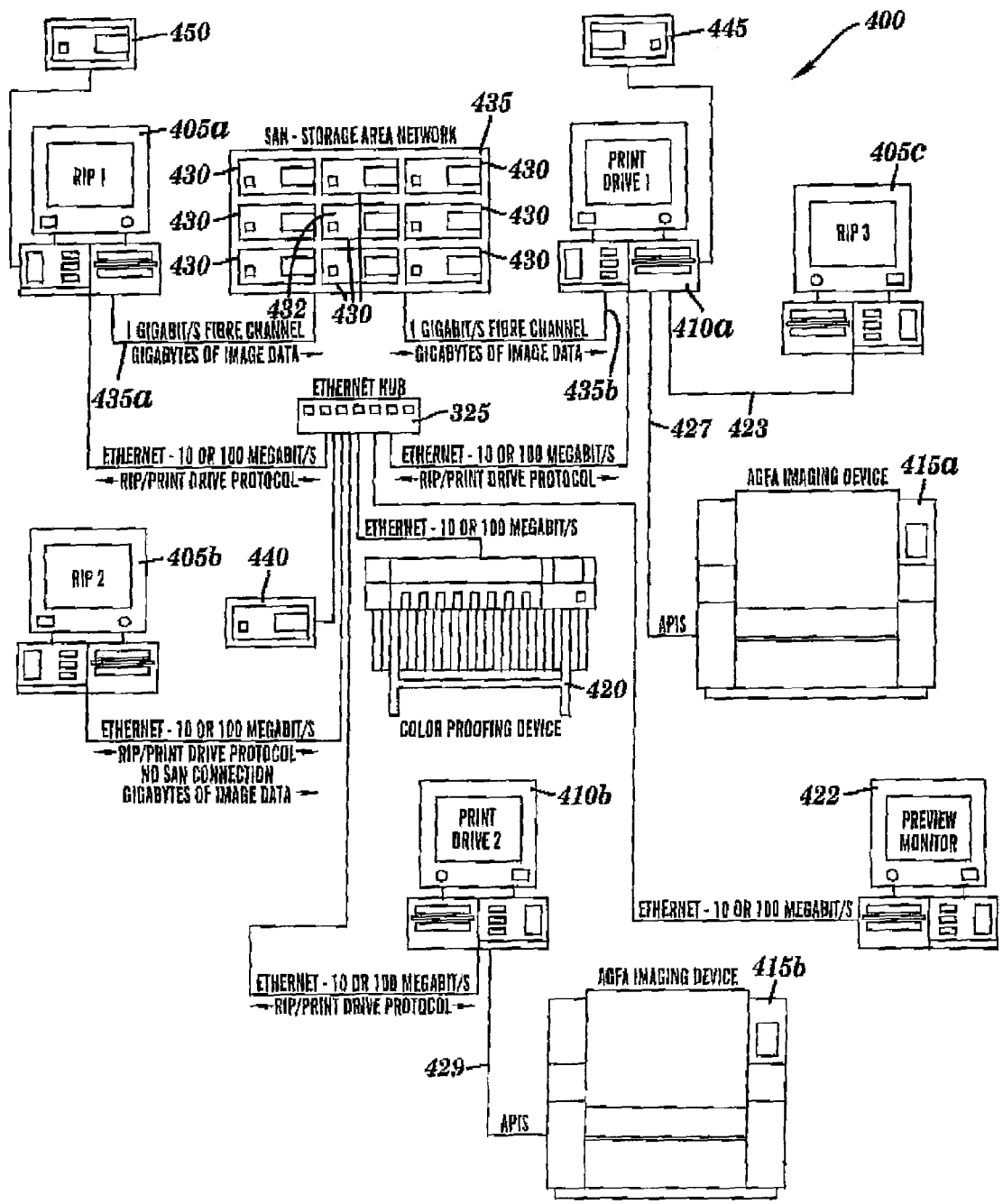
FIG. 7 depicts a flexible networked imaging system in accordance with the present invention.

FIG. 7 depicts a preferred embodiment of the enhanced flexible networked image processing system 400 in accordance with the present invention. As shown, the networked system includes multiple raster image processors (RIPs) 405a, 405b and 405c, multiple print drive servers (PDSs) 410a and 410b, and multiple image markers (IMs) 415, 420, and 422. Also included are multiple storage devices 430, 440, 445 and 450, for storing data generated by the RIPs.

The multiple RIPs include RIP 405a, which is capable of operating as described above with reference to FIGS. 3–6. That is, RIP 405a generates raster image data in a predefined format desired by the applicable PDS, compresses this data in accordance with the appropriate improved compression algorithm, and writes this data in a file on the appropriate shared storage device or transmits the data to the applicable PDS.

RIP 405b is another type RIP, for example a third party RIP, which generates raster image data in a different predefined format, e.g. one of well known formats DCS or TIFF. RIP 405b may either be incapable of compressing the generated data or may compresses the generated data in accordance with a compression algorithm other than an improved compression algorithm of the type described above. Because RIP 405b is not configured to operate with the PDSs it is also incapable of writing the generated uncompressed or compressed data in a file on a shared remote storage device accessible to the applicable PDS.

RIP 405c is still another type RIP, for example an older RIP, which might be characterized as a legacy RIP. RIP 405c generates raster image data, and further processes this uncompressed generated data to generate uncompressed instructions for directly driving an IM, such as an imagesetter.

As will described further below, the multiple PDSs include a primary PDS 410a which is capable of managing the imaging of jobs originating with any of the RIPs 405a–405c, having data stored on any of the storage devices 430, 440, 445 and 450 and imaged on any of the IMs 415, 420 and 422. Also included is a satellite PDS 410b, which is only capable of imaging jobs originating with any of the RIPs 405a–405c, *having data stored on certain of the storage devices 430, 440, 445 and 450 and imaged on only certain of the IMs 415, 420 and 422.*

The IMs include multiple pre-press image setters (PPISs) 415a and 415b, each having an optical scan assembly, such as a laser scanner, and a support surface, such as a cylindrical drum. The IMs also include an image proofer (IP) 420 which could, for example, be a color proofing device, and a preview monitor (PM) 422, which could be a programmed personal computer or workstation, having a display and input device such as a keyboard and/or mouse.

The multiple storage devices include storage devices 430 and 440, which are remote to both the RIPs 405a–405c and the PDSs 410a and 410b. Also included is storage device 445, which is local to PDS 410a but remote to the RIPs 405a–405c and PDS 410b, and storage device 450 which is local to the RIP 405a but remote to the other RIPs 405b–405c and to the PDSs 410a–410b. It will be recognized that if, for example, PDS 410a and RIP 405a were configured on a single workstation the storage device 445 or 450 would be local to both that RIP and PDS.

An Ethernet network 425, preferably formed of optical fiber or high-speed copper cable, interconnects the RIPs 405a–405b, PDSs 410a–410b, IP 420, PM 422, and storage device 440, thus providing a links between each of the multiple RIPs 405a–405b and the multiple PDSs 410a–410b, between the PDSs 410a–410b, between the PDS 410a and the IP 420 and PM 422, between the PDS 410b and the IP 420, between the RIP 405a and the shared storage device 440, and between the PDS 410a and the shared storage device 440. The PDS 410a is connected to the RIP 405c via a dedicated link 423, and to the PPIS 415a via a dedicated link 427. Additionally, PDS 410b is connected to the PPIS 415b via a dedicated link 429. It will be recognized that, if desired, the system 400 could include additional RIPs, PDSs, IMs and storage devices which could also be interconnected in a similar manner.

A storage area network (SAN) 435, which is preferably also formed of optical fiber or copper cable, interconnects the pool 432 of remote storage devices 430 with RIP 405a and the PDS 410a, thus providing respective dedicated links 435a between the remote storage device pool 432 and the RIP 405a and 435b between the remote storage devices pool 432 and the PDS 410a. It will of course be recognized that the system could, and in a practical implementation would in all likelihood, include multiple RIPs 405a, each connected by a respective dedicated link to the remote storage device pool 432 via the SAN 435. Accordingly, the networked pre-press imaging system 400 of FIG. 7 includes overlapping networks, i.e. Ethernet network 425 and SAN 435.

Preferably, the dedicated links 435a and 435b provided by the SAN 435 are very high speed, e.g. 100 Megabyte per second connections. The SAN could be implemented as a very high speed Ethernet if desired as will be well understood by those skilled in the art. Advantageously, each of the multiple remote storage devices 430 forming the SAN storage pool 432, includes a fast, large memory device, as are well know in the art. The multiple remote storage devices 430 are configured in the storage device pool 432, as shown, so as to be easily expandable by adding additional remote storage devices 430 to the storage device pool 432.

In operation, each of the networked system RIPs 405a–405c receives, as input, a digitized image from a respective or shared front-end processor (not shown) or via user commands entered on a user input device (not shown). The applicable RIP processes the received input to generate raster image data representing the input image.

In the case of the RIP 405a, the generated raster image data is preferably compressed using one of the improved compression algorithms described above with reference to FIGS. 3–5. As described in detail above with reference to FIG. 6, the compressed raster image data may be directly transmitted via the SAN 435 to the multiple remote, mapped, shared storage devices 430 of the SAN pool 432 via the dedicated SAN link 435a between the RIP 405a and storage device pool 432. Alternatively, the raster image data can be directly transmitted via the Ethernet 425 to another remote, mapped shared storage device, such as storage device 440, via a link on the Ethernet network 425 between the RIP 405a and remote storage device 440. In a still further alternative, the raster image data can be directly transmitted to a local storage device, such as storage device 450, which is remote to the PDS 410a.

If the raster image data is stored on the SAN storage device pool 432, it is retrieved by the PDS 410a directly from SAN storage device pool 432, via the dedicated SAN link 435b between the PDS 410a and storage device pool 432. On the other hand, if the raster image data is stored on the remote, mapped, shared storage device 440, it is retrievable by the PDS 410a directly from storage device 440, via a link on the Ethernet network 425 between the PDS 410a and remote storage device 440. If the raster image data is stored on the local (RIP 405a) storage device 450, it may be retrieved by the PDS 410a directly from storage device 450, via the dedicated SAN links 435a and 435b between the PDS 410a and RIP 405a.

However, if the PDS 410a destination drive letter designation is not to a mapped remote storage device, the RIP 405a will transmit the compressed raster image data to the PDS 410a over the SAN 435. The transmitted raster image data will be written to the identified storage device by the PDS 410a. For example, if the non-mapped storage device is the local storage device 445, the transmitted raster image data will be written to the local storage device 445 by the PDS 410a using local file access.

As also described above with reference to FIG. 6, if the PDS 410a destination drive letter designation were to a remote, rather than local, non-mapped storage device on the Ethernet network 425, the RIP 405a would similarly transmit the raster image data to the PDS 410a over the SAN 435. However, the transmitted raster image data would then be written to the identified remote storage device (not shown) by the PDS 410a via a link on the Ethernet network 425 using remote file access.

RIP 405b is not connected to the SAN 435. Accordingly, RIP 405b cannot transmit the raster image data directly via the SAN 435 to the remote storage device pool 432 of the SAN pool 432. RIP 405b could directly transmit the generated data via the Ethernet 425 to remote storage device 440, via a link on Ethernet network 425 between the RIP 405b and remote storage device 440, and transmit a notice of the writing of the data to the PDS 410a via Ethernet network 425. However, since the RIP 405b cannot map the PDS 410a designation for remote storage device 440 to the RIP 405b designation for that storage device 440, there is no way to ensure that PDS 410a will be able to access data stored on the storage device 440 by the RIP 405b. Therefore, the RIP 405b transmits the generated raster image data to the PDS 410a via the Ethernet network 425. The transmitted raster image data is then written to, for example, local storage device 445 or the SAN storage device pool 432 by the PDS 410a using either local or remote file access, as appropriate.

As noted above, RIP 405b may generate raster image data in an undesirable predefined format, such as DCS or TIFF. Further, the RIP 405b may transmit the data in an uncompressed state or compressed based on an undesirable compression algorithm. Hence, the PDS 410a optionally decompresses the raster image data transmitted by the RIP 405b via the Ethernet 425, and reformats the decompressed or uncompressed data, e.g. from DCS or TIFF to the desired format. PDS 410a also preferably compresses the reformatted raster image data using one of the above described improved compression algorithms, and stores the reformatted compressed raster image data at local storage device 445 or SAN storage device pool 432 using local or remote file access, as appropriate.

RIP 405c is not connected to either the SAN 435 or the Ethernet 425. Accordingly, RIP 405b cannot transmit the raster image data directly to the remote storage device pool 432 via the SAN 435, or to remote storage device 440 device via the Ethernet network 425. Rather, the RIP 405c transmits the generated raster image data to the PDS 410a via the dedicated or separate network link 423, which is neither part of the SAN 435 or Ethernet network 425. As noted above, legacy or other type RIP's, such as RIP 405c, may not only generate raster image data, but could also further process the generated uncompressed raster image data to generate uncompressed instructions for directly driving an IM, such as PPIS 415a or 415b. Hence, the PDS 410a is additionally configured to convert the IM instructions transmitted by the RIP 405c via the dedicated link 423 to raster image data, to optionally reformat this raster image data, e.g. from DCS or TIFF to the desired format, to preferably compress the raster image data, whether or not reformatted, using one of the above described improved compression algorithms, and to store the reformatted compressed raster image data at, for example, local storage device 445 or the SAN storage device pool 432 using local or remote file access, as appropriate.

As described in detail with reference to FIG. 6, in order for the PDS 410a to retrieve raster image data from a shared storage device, such as the SAN storage device pool 432, remote storage device 440, or local RIP storage device 450, the RIP 405a and the PDS 410a coordinate on the destination and identity of the storage device. The PDS's destination drive letter designation is mapped so the RIP 405a can transmit the raster image data directly to the applicable storage device. The transmitted raster image data is written to the identified storage device by the RIP 405a using local or remote file access, as appropriate.

If, on the other hand, 1) the destination drive letter designation furnished by the PDS 410a to RIP 405a is not to a shared storage device, but rather is to a unshared storage device, such as PDS local storage device 445, or 2) the raster image data is generated by a third party, legacy or other type RIP, such as RIP 405b or RIP 405c, which is not configured to coordinate storage with the PDS 410a, the applicable RIP will transmit the raster image data or IM instructions, as applicable, to the PDS 410a over either the SAN 435 in the case of RIP 405a, the Ethernet network 425 in the case of the RIP 405b, or some other link in the case of the RIP 405c. The transmitted raster image data or IM instruction will be processed, as appropriate, and written to the desired storage device by the PDS 410a, using either remote or local file access, as applicable.

In all the above cases, the PDS 410a can retrieve the raster image data from the SAN storage device pool 432; mapped, remote storage device 440; mapped local RIP storage device 450; or unmapped local PDS storage device 445 and process the retrieved data to generate appropriate instructions to the applicable IM. More particularly, the PDS 410a, opens the stored compressed raster image data file, reads the compressed raster image data, and decompresses the read compressed raster image data. As is well understood in the art, the raster image data may be either flat based with an image file for each color separation, or page assembly based with an image file for each color separation of each element, i.e. the blank flat and pages to be merged into the flat. With page assembly based image files, the placement information is provided with the raster image data by the RIP. If the decompressed raster image data is page assembly based, PDS 410a processes this data to merge together the color elements of each page. PDS 410a performs the appropriate driver specific processing on, in the case of page assembly based data, the merged decompressed raster image data, or, in the case of flat based data, the un-merged decompressed raster image data to generate the IM instructions. For example, such processing may be performed to generate instructions relating to monitor scale and merger of color planes; proofer de-screening, scaling and merger of color planes; or reformatting to a standard or other format. The generated instructions may be transmitted from the PDS 410a to the applicable target IM via either the Ethernet network 425 or a dedicated nonnetwork link 427. More particularly, if instructions are generated by the PDS 410a for the IP 420 or the PM 422, the instructions are transmitted via the Ethernet network 425. On the other hand, if the instructions are generated by the PDS 410a for the PPIS 415a, the instructions are transmitted via the dedicated non-network link 427. Beneficially, the PDS instructions for the IP 420 and/or PM 422 are transmitted to the IP 420 and/or PM 422 prior to PDS instructions for PPIS 415a being transmitted to the PPIS 415a. The transmitted instructions are written at the target IM.

The PM 422 operates in accordance with the received PDS 410a instructions to display selected color planes of the applicable job or job element(s) for inspection by a system operator, as is well understood in the art. The IP 420 operates in accordance with the received PDS 410a instructions to generate an image proof, e.g. a lower resolution, e.g. 8 bit, large format color sample, for inspection by a system operator, as is also well understood in the art. If the display and/or proof are determined to be acceptable, the PDS 410a instructions for the PPIS 415a are transmitted via the dedicated non-network link 427 from the PDS 410a to the PPIS 415a. In accordance with these received instructions, the optical scan assembly of the PPIS 415a operates to scan the image represented by the PDS instructions onto a plate or film supported by the support surface of the PPIS 415a. The image input to the applicable RIP is thereby transferred to the plate or film as a high resolution image. The film or plate can in turn be used to print the input image on other media, e.g. paper.

If the output drive device is the PDS 410b, in one preferred implementation the PDS 410a retrieves the compressed raster image data from the SAN storage device pool 432; mapped, remote storage device 440; mapped local RIP storage device 450; or unmapped local PDS storage device 445, just as with raster image data which will be processed by PDS 410*a* to generate instructions for an IM. The PDS 410*a*, opens the stored compressed raster image data file and reads the compressed raster image data. The read data is optionally decompressed and reformatted to, for example a standard TIFF format by the PDS 410*a*. The reformatted raster image data may be compressed by PDS 410*a*, but in any event is transmitted to PDS 410*b* via Ethernet network 425.

In an alternative implementation, the PDS 410*b* directly retrieves the stored raster image data from the applicable storage device, e.g. storage device 440. The PDS 410*b*, opens the stored compressed raster image data file and reads the compressed raster image data. The read data is decompressed and optionally reformatted to, for example a standard TIFF format by the PDS 410*b*.

Notwithstanding which of the above alternatives is implemented, PDS 410*b* next processes the transmitted raster image data to generate appropriate instructions to the applicable IM. It will be recognized that the PDS 410*b* may locally store the received or retrieved data prior to decompression, reformatting and/or processing if so desired. As described in detail above, the raster image data, in for example a TIFF format, may be either flat based with an image file for each color separation, or page assembly based with an image file for each color separation of each element. If the raster image data is page assembly based, PDS 410*b* processes this data to merge together the color elements of each page. PDS 410*b* performs the appropriate driver specific processing on, in the case of page assembly based data, the merged raster image data, or, in the case of flat based data, the un-merged raster image data to generate the appropriate IM instructions. Since, the PDS 410*b* does not interface with the preview monitor 422, the processing performed by the PDS 410*b* will typically be more limited than that performed by the PDS 410*a*. For example, the processing performed by PDS 410*b* could be limited to that associated with generating instructions for a proofer, such as IP 420, and an imagesetter, such as PPIS 415*b*. Such instructions may, for example, include instructions for proofer de-screening, scaling and merger of color planes.

The generated instructions may be transmitted from the PDS 410*b* to the applicable target IM via the Ethernet network 425 or a dedicated non-network link 429. More particularly, if instructions are generated by the PDS 410*b* for the IP 420, the instructions are transmitted via the Ethernet network 425. On the other hand, if the instructions are generated by the PDS 410*b* for the PPIS 415*b*, the instructions are transmitted via the dedicated non-network link 429.

As previously described, the PDS instructions for the IP 420 are preferably transmitted to the IP 420 prior to PDS instructions being transmitted to the PPIS 415*b*. The transmitted instructions are written to the target IM. The IP 420 operates in accordance with the received PDS 410*b* instructions to generate an image proof for inspection by a system operator. If the proof is acceptable, the PDS 410*b* instructions for the PPIS 415*b* are transmitted via the dedicated non-network link 429 from the PDS 410*b* to the PPIS 415*b*. In accordance with these received instructions, the optical scan assembly of the PPIS 415*b* operates to scan the image represented by the PDS instructions onto a plate or film supported by the support surface of the PPIS 415*b*. The image input to the applicable RIP is thereby transferred to the plate or film as a high resolution image. The film or plate can in turn be used to print the input image on other media, e.g. paper.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. imaging, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

I claim:

1. A networked imaging system, comprising:

a first communications network;

a second communications network, different than the first communications network;

a first storage device interconnected to the first network;

a second storage device interconnected to the second network;

a first raster image processor interconnected to the first network and the second network, and configured to generate first image data representing a first image and to write the first image data to the first storage device via the first network, and to transmit via the second communications network a message indicative of the first image data having been written to the first storage device;

a second raster image processor interconnected to the second network, and configured to generate second image data representing a second image and to transmit the second image data over the second network;

a first print driver server interconnected to the first and the second networks, and configured to receive the second image data over the second network and to write the second image data to the second storage device via the second network and to transmit via the second communications network a message indicative of the second image data having been written to the second storage device and to read the first image data from the first storage device via the first network, and to generate first drive instructions corresponding to the written first image data;

a second print driver server interconnected to the second network, and configured to read the second image data from the second storage device via the second network and to generate second drive instructions corresponding to the written second image data;

a first image maker configured to generate a representation of the first image in accordance with the first drive instructions; and a second image maker configured to generate a representation of the second image in accordance with the second drive instructions.

2. A system according to claim 1, wherein:

the first image maker is a first imagesetter; and the second image maker is a second imagesetter, different than the first imagesetter.

3. A system according to claim 1, wherein:

the first communications network includes a respective dedicated link, having a first bandwidth, between the first image processor and the first storage device, and between the first print driver and the first storage device;

the second communications network includes links having a second bandwidth; and the first bandwidth is greater than the second bandwidth.

4. A system according to claim 1, wherein:
the first image processor is further configured to compress the first image data;
the written first image data is the compressed first image data;
the first print driver is further configured to decompress the written first image data, to compress the generated second image data, and to process the decompressed first image data to generate the first drive instructions; and
the written second image data is the compressed second image data.

5. A system according to claim 1, wherein:
the second image processor is further configured to generate the second image data in a first format;
the first print driver is further configured to reformat the second image data from the first format to a second format and to compress reformatted second image data; and
the written second image data is the compressed reformatted second image data.

6. A system according to claim 1, wherein:
the first print driver is further configured to compress the second image data; and the written second image data is the compressed second image data.

7. A system according to claim 1, wherein:
the written second image data is in a first format;
the first print driver is further configured to reformat the written second image data from the first format to a second format; and
the second print driver is further configured to process the reformatted second image data to generate the second drive instructions.

8. A system according to claim 1, wherein:
the first image processor is further configured to convert a first sequence of characters representing the first image into a second sequence of characters, including a predefined compression code for one of white image data and black image data, in order to generate the first image data;
the written first image data includes the second sequence of characters; and
the first print driver is further configured to covert the written second sequence of characters into the first sequence of characters based on the predefined compression code in order to generate the first drive instructions.

9. A system according to claim 8, wherein:
the first image processor is further configured to covert the first sequence of characters by reading a first character in the first sequence of characters, to determine if the read first character represents the one of the white and the black image data, if so, to read one or more characters occurring immediately subsequent to the first character in the first sequence of characters, to determine if the read one or more characters match the read first character, and, if so, to generate the second sequence of characters to represent the matching one or more characters.

10. The method of claim 1, wherein the message indicative of the first image data having been written to the first storage device identifies the location of the first image data on the first storage device.

11. The method of claim 1, wherein the message indicative of the second image data having been written to the second storage device identifies the location of the second image data on the second storage device.

12. A method for generating a representation of an image, comprising:
writing, by a first raster image processor, first image data, representing a first image, to a first storage device via a first communications network;
transmitting, by the first raster image processor, via a second communications network, a message indicative of the first image data having been written to the first storage device;
receiving by a first print driver server the message indicative of the first image data having been written to the first storage device;
retrieving by the first print driver server the written first image data from the first storage device via the first communications network;
generating by the first print driver server first instructions corresponding to the retrieved first image data;
writing by a second raster image processor second image data, representing a second image, to a second storage device via the second communications network;
retrieving by a second print driver server the written second image data from the second storage device;
generating second instructions corresponding to the retrieved second image data;
generating by a first image maker a representation of the first image in accordance with the first instructions; and
generating by a second image maker a representation of the second image in accordance with the second instructions.

13. A method according to claim 12, wherein the second image data is written to the second storage device via the second communications network.

14. A method according to claim 12, wherein:
the first communications network has an associated first bandwidth;
the second communications network has an associated second bandwidth; and
the first bandwidth is greater than the second bandwidth.

15. A method according to claim 12, further comprising:
compressing the first image data, wherein the written first image data is the compressed first image data and the retrieved first image data is the written compressed first image data;
decompressing the retrieved first image data; and
processing the decompressed first image data to generate the first drive instructions.

16. A method according to claim 12, further comprising:
reformatting the second image data from a first format to a second format; and
compressing the reformatted second image data;
wherein the written second image data and the retrieved written second image data are the compressed reformatted second image data.

17. A method according to claim 12, further comprising:
compressing the second image data;
wherein the written second image data and the retrieved written second image data are the compressed second image data.

18. A method according to claim 12, further comprising:
reformatting the written second image data from a first format to a second format, wherein the transmitted second image data is the reformatted second image data; and processing the reformatted second image data to generate the second drive instructions.

19. A method according to claim 12, further comprising:
generating the first image data by converting a first sequence of characters representing the first image into a second sequence of characters, including a predefined compression code for one of white image data and black image data, wherein the written first image data includes the second sequence of characters; and
converting the written second sequence of characters into the first sequence of characters based on the predefined compression code in order to generate the first drive instructions.

20. A method according to claim 19, wherein:
the first sequence of characters are converted by reading a first character in the first sequence of characters, determining if the read first character represents the one of the white and the black image data, if so, reading one or more characters occurring immediately subsequent to the first character in the first sequence of characters, determining if the read one or more characters match the read first character, and, if so, generating the second sequence of characters to represent the matching one or more characters.

* * * * *